(12) United States Patent
Lee et al.

(10) Patent No.: US 8,861,318 B1
(45) Date of Patent: Oct. 14, 2014

(54) THERMALLY ASSISTED MAGNETIC WRITE HEAD, AND METHOD OF MANUFACTURING THE SAME

(71) Applicants: SAE Magnetics (H.K.) Ltd., Hong Kong (CN); TDK Corporation, Tokyo (JP)

(72) Inventors: Tai Boon Lee, Dongguan (CN); Bing Ma, Dongguan (CN); Wei Liang Chen, Dongguan (CN); Hong Tao Ma, Dongguan (CN); Yasutoshi Fujita, Hong Kong (CN); Hideki Tanzawa, Hong Kong (CN); Ryuji Fujii, Hong Kong (CN); Kei Hirata, Tokyo (JP); Makoto Isogai, Tokyo (JP); Takeshi Tsutsumi, Tokyo (JP)

(73) Assignees: SAE Magnetics (H.K.) Ltd., Hong Kong (CN); TDK Corporation, Tokyo (JP)

( * ) Notice: Subject to any disclaimer, the term of this patent is extended or adjusted under 35 U.S.C. 154(b) by 0 days.

(21) Appl. No.: 14/097,684

(22) Filed: Dec. 5, 2013

(51) Int. Cl.
  *G11B 11/24* (2006.01)
(52) U.S. Cl.
  USPC ................................................ 369/13.33
(58) Field of Classification Search
  None
  See application file for complete search history.

(56) References Cited

U.S. PATENT DOCUMENTS

| 7,330,404 | B2 | 2/2008 | Peng et al. | |
| 8,295,003 | B2* | 10/2012 | Chou et al. | 360/59 |
| 8,325,570 | B1* | 12/2012 | Tanaka et al. | 369/13.33 |
| 8,395,973 | B2* | 3/2013 | Kitazawa et al. | 369/13.03 |
| 8,472,287 | B1* | 6/2013 | Isogai et al. | 369/13.33 |
| 8,509,038 | B1* | 8/2013 | Sasaki et al. | 369/13.33 |
| 2012/0084969 | A1* | 4/2012 | Tanaka et al. | 29/603.01 |
| 2012/0147716 | A1* | 6/2012 | Hara et al. | 369/13.33 |

OTHER PUBLICATIONS

U.S. Appl. No. 13/746,771, filed Jan. 22, 2013.
U.S. Appl. No. 13/568,542, filed Aug. 7, 2012.

\* cited by examiner

*Primary Examiner* — Peter Vincent Agustin
(74) *Attorney, Agent, or Firm* — Nixon & Vanderhye PC

(57) ABSTRACT

A thermally assisted magnetic write head includes a waveguide having a first end surface included in an air bearing surface; a magnetic pole having a second end surface included in the air bearing surface; a plasmon generator having a third end surface included in the air bearing surface; a first protective film directly covering a part of the second end surface of the magnetic pole at least; and a second protective film directly covering the first end surface of the waveguide and the third end surface of the plasmon generator. The configuration can reduce recording density and improve thermal stability, furthermore increase the producing yield.

16 Claims, 12 Drawing Sheets

THERMALLY ASSISTED MAGNETIC WRITE HEAD, AND METHOD OF MANUFACTURING THE SAME

FIELD OF THE INVENTION

The present invention relates to a hard disk drive (HDD) and, more particularly, to a thermally assisted magnetic write head in which near field light is applied to lower a coercivity of a magnetic recording medium so as to record information, and to a head gimbals assembly (HGA), a head arm assembly (HAA), and a magnetic disk unit that are mounted with the thermally assisted magnetic write head, and a manufacturing method thereof.

BACKGROUND OF THE INVENTION

Hard disk drives are common information storage devices. A typical disk drive unit essentially consists of a series of rotatable disks mounted on a spindle motor, and an HAA which is rotatable about an actuator arm axis for accessing data tracks on disks during seeking. The HAA includes at least one drive arm and an HGA. Typically, a spindling voice-coil motor (VCM) is provided for controlling the motion of the drive arm. The HGA includes a magnetic read write head that records information into the magnetic disk and reproduces information stored in the magnetic disk, and a suspension to load or suspend the magnetic read write head thereon.

For increasing the recording density of the magnetic disk, and meanwhile improving thermal stability of the magnetization of the magnetic microparticles in the magnetic disk, a so-called thermally assisted magnetic writing technology has been developed, recently. In this technology, a magnetic recording medium with large coercivity is used, and when information is written, heat is applied together with the magnetic field to a section of the magnetic recording medium where the information is to be written to increase the temperature and lower the coercivity of that section, thereby writing the information. Hereinafter, the magnetic head used in the thermally assisted magnetic writing is referred to as a thermally assisted magnetic write head.

In performing the thermally assisted magnetic writing, near field light is generally used for applying heat to a magnetic recording medium. In this technology, light propagating through a waveguide (guided light) is not directly applied to a plasmon generator, but the guided light is coupled to the plasmon generator through evanescent coupling, and surface plasmon polaritons generated on a surface of the plasmon generator are utilized. U.S. Pat. No. 7,330,404 proposes such a thermally-assisted head using surface plasmon polariton coupling.

The thermally assisted magnetic write head that utilizes the surface plasmon polariton suppresses a rise in temperature of the plasmon generator to some extent. However, it was confirmed that, when Au (gold) is used to configure the plasmon generator for example, there are cases where contraction (agglomeration) resulting from heat occurs especially in a section, near the ABS, where a volume is low and where the heat concentrates.

Such agglomeration is considered to be a phenomenon caused by gold configuring the plasmon generator not being in a stabled state such as a bulk state. That is, since gold formed through a plating method, a sputtering method, or the like is low in density, it is considered that a rise in temperature upon operation of the thermally assisted magnetic write head increases the density thereof, and a crystalline structure thereof advances toward a stabilized state.

Hence, it is desirable that a heat treatment be performed in advance during manufacturing to stabilize the crystalline structure of a material (such as gold) configuring the plasmon generator.

On the other hand, since the thermally-assisted magnetic write head is usually provided together with a magnetic read head that includes the MR element, it is desirable that a heat treatment at a temperature that thermally damages operation performance of the MR element be avoided. Therefore, sufficiently stabilizing a crystalline structure of a constituent material of the plasmon generator to sufficiently suppress the agglomeration thereof upon operation is virtually difficult. When such agglomeration occurs, an end section of the plasmon generator is recessed from the ABS and is away from a magnetic recording medium, incurring a decrease in recording performance.

Accordingly, it is desired to provide an improved thermally assisted magnetic write head capable of suppressing agglomeration of a plasmon generator upon operation, performing higher density magnetic recording.

SUMMARY OF THE INVENTION

One objective of the present invention is to provide a thermally assisted magnetic write head, which can reduce recording density and improve thermal stability.

Another objective of the present invention is to provide a head gimbal assembly, which can reduce recording density and improve thermal stability.

Still another objective of the present invention is to provide a head arm assembly, which can reduce recording density and improve thermal stability.

Yet an objective of the present invention is to provide a magnetic disk unit, which can reduce recording density and improve thermal stability.

Yet another objective of the present invention is to provide a method of manufacturing a thermally assisted magnetic write head, which can reduce recording density and improve thermal stability.

To achieve above objectives, a thermally assisted magnetic write head of the present invention includes a waveguide having a first end surface included in an air bearing surface; a magnetic pole having a second end surface included in the air bearing surface; a plasmon generator having a third end surface included in the air bearing surface; a first protective film directly covering a part of the second end surface of the magnetic pole at least; and a second protective film directly covering the first end surface of the waveguide and the third end surface of the plasmon generator.

As a preferable embodiment, the first protective film is formed of diamond-like carbon.

Alternatively, the first protective film is formed of diamond-like carbon.

As another preferable embodiment, the second protective film is formed of tantalum oxide ($TaO_x$).

As another preferable embodiment, a part of the second end surface of the magnetic pole is directly covered by the second protective film.

Preferably, a light shield adjacent the magnetic pole thereby protecting other components of the thermally assisted magnetic write head.

A head gimbals assembly, a head arm assembly, and a magnetic disk unit according to embodiments of the invention each include the above-described thermally-assisted magnetic write head.

A method of manufacturing a thermally assisted magnetic write head, comprising steps of:

(1) forming an air bearing surface through polishing an end surface of a multilayer, the multilayer including a waveguide, a magnetic pole, and a plasmon generator;

(2) forming a first protective film to cover the air bearing surface;

(3) forming an opening by selectively removing a part, of the first protective film, that covers the waveguide and the plasmon generator; and (4) forming a second protective film to fill the opening so as to directly cover end surfaces, included in the air bearing surface, of the waveguide and the plasmon generator.

As an embodiment of the present invention, the step (3) includes forming a photoresist film to cover the first protective film;

irradiating a light or laser to a back surface of the waveguide opposite the end surface, to form an exposed area corresponding to the end surfaces of the waveguide and the plasmon generator; and forming the opening by etching the exposed area.

Preferably, the light or laser has a wavelength that is lower than 500 nm.

Preferably, the step (4) includes forming the second protective film to cover the photoresist film and fill the opening; and removing the photoresist film.

Preferably, further includes forming a light shield adjacent the magnetic pole thereby protecting other components of the thermally assisted magnetic write head.

Preferably, the step (3) is performed on a row bar or multiple row bars with a plurality of thermally assisted magnetic write heads. Preferably, further includes putting the row bars on a quartz substrate, and irradiating a light or laser to a side of the quartz substrate.

In comparison with the prior art, on one hand, the end surface of the magnetic pole is covered by the first protective film, and the end surface of the plasmon generator are covered by the second protective film, thus, when using a laser to enter to the plasmon generator, agglomeration arising from a rise in temperature of the plasmon generator upon operation is suppressed. As a result, higher-density magnetic recording is possible, and the product lifetime increases.

Other aspects, features, and advantages of this invention will become apparent from the following detailed description when taken in conjunction with the accompanying drawings, which are a part of this disclosure and which illustrate, by way of example, principles of this invention.

BRIEF DESCRIPTION OF THE DRAWINGS

The accompanying drawings facilitate an understanding of the various embodiments of this invention. In such drawings:

FIG. 3b is an enlarged partial side view of the thermally assisted magnetic head slider shown in FIG. 3a;

DETAILED DESCRIPTION OF ILLUSTRATED EMBODIMENTS

Figure 1:
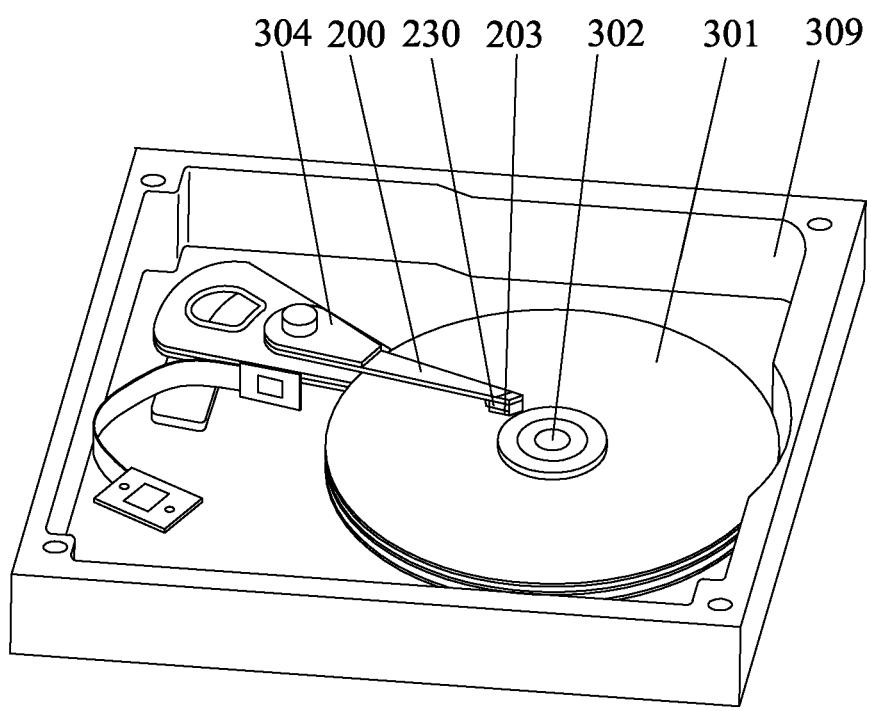
FIG. 1 is a perspective view of an HDD according to an embodiment of the invention.

Various preferred embodiments of the invention will now be described with reference to the figures, wherein like reference numerals designate similar parts throughout the various views. As indicated above, the invention is directed to a thermally assisted magnetic write head, HGA, HAA, HDD with the same, and directed to a manufacturing method thereof, thereby reducing recording density and improving thermal stability.

Figure 2:
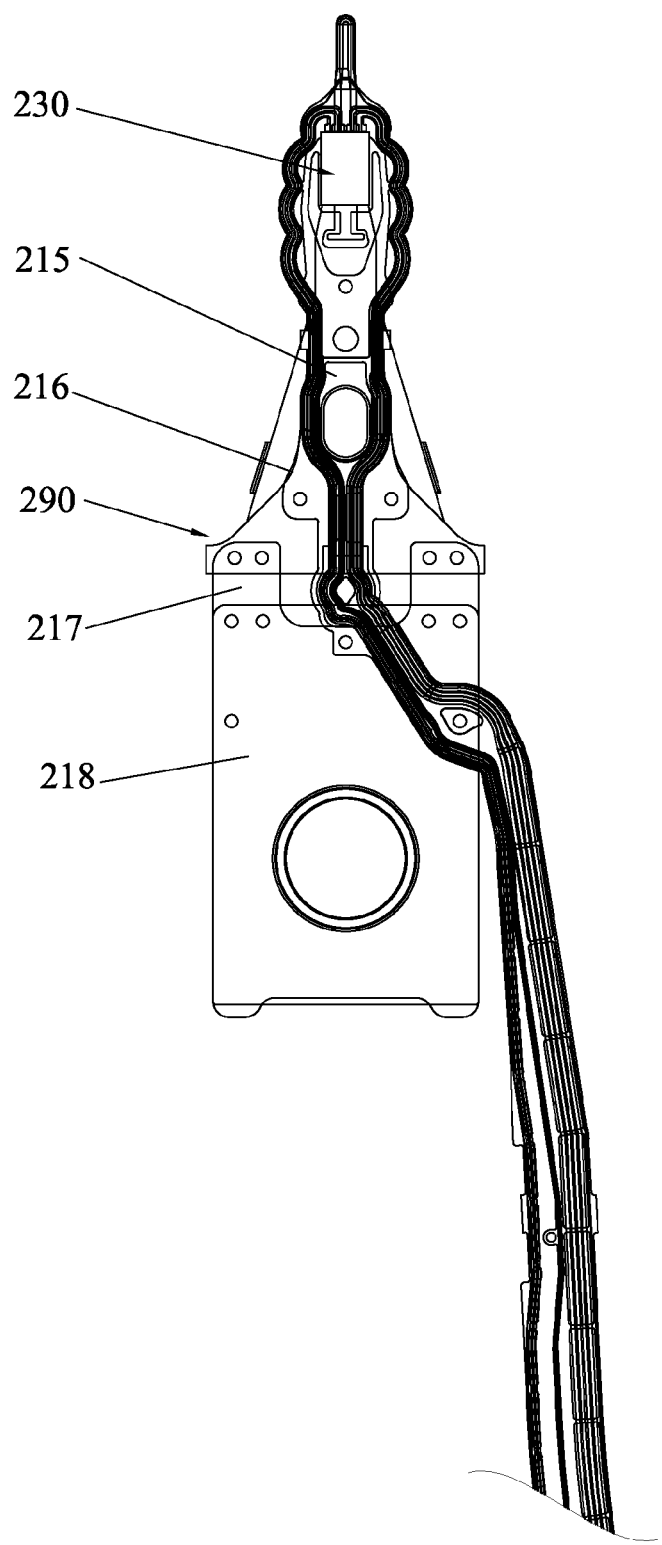
FIG. 2 is a perspective view of an HGA of the HDD shown in FIG. 1.

FIG. 1 is a perspective view of an HDD according to an embodiment of the present invention. The HDD 300 includes several HAAs having multiple HGAs 200 and drive arms 304 stacked and connected to the HGAs 200, a series of rotatable disks 301, and a spindle motor 302 to spin the disk 301, all of which are mounted in a housing 309. The structure of the HDD 300 according to the present invention is not limited to that described above. For example, the number of the rotatable disks 301, HGAs 200 and drive arms 304 may be one. As shown in FIG. 2, each HGA 200 includes a suspension 290 and a thermally assisted magnetic head slider 230 carried on the suspension 290 which has a thermally assisted magnetic head as a thin-film magnetic head for reading from and writing into the rotatable disks 301. The suspension 290 includes a load beam 216, a base plate 218, a hinge 217 and the flexure 215, all of which are assembled with each other. Specifically, the thermally assisted head slider 230 is carried on the flexure 215.

As shown in FIG. 3, the thermally assisted magnetic head slider 230 includes a substrate 203, a thermally assisted magnetic read write head 340 embedded in the substrate 203 for reading and writing. The substrate 203 may be substantially formed as a hexahedron, for example, and one surface thereof corresponds to an ABS 241 that is disposed in proximity to and to face the recording surface of the magnetic disk 301. When the disk 301 is rotated at a high speed, the slider 230 will move above the front surface of the magnetic disk 301 to be in a load state. The high-speed rotation of the magnetic disk 301 causes an air flow between the recording surface and the ABS 241, and the resulting lift force leads to a state where the slider 230 floats to maintain a certain distance (magnetic spacing) in a direction orthogonal to the recording surface.

Concretely, referring to FIG. 3 again, the substrate 203 includes a leading edge (not shown), a trailing edge 205, an ABS 241 facing to the disk and processed so as to provide an appropriate flying height, an opposing surface 242 opposite the ABS 241, and a thermally assisted magnetic read write head 340 embedded in the trailing edge 205. The trailing edge 205 has multiple bonding pads 207, such as eight, to couple with a suspension 209 of the HGA 200. Specifically, the light source module 220 is mounted on the opposing surface 242. In this embodiment, the light source module 220 is a laser diode module, but not limited to that.

Concretely, thermally assisted magnetic head 340 includes a magnetoresistive (MR) read head (not shown) formed on the substrate 203 and a write head 342 formed on the MR read head. For example, the MR read head can be Current Perpendicular to Plane (CPP) sensor, Current In Plane (CIP) sensor, tunnel magnetoresistive (TMR) sensor, giant magnetoresistive (GMR) sensor, or anisotropic magnetoresistive (AMR) sensor and the like.

Figure 4A:
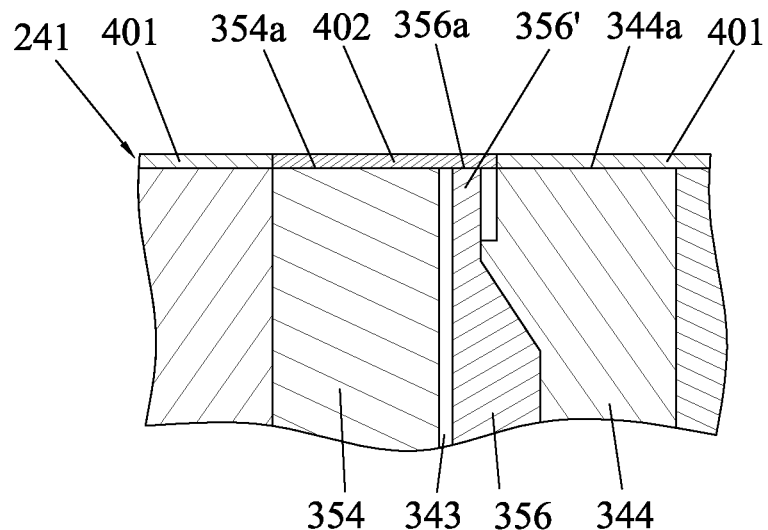
FIG. 4a is a cross-sectional view of the thermally assisted magnetic write head shown in FIG. 2 according to an embodiment of the present invention.

FIG. 4a is an enlarged sectional view of the thermally assisted magnetic write head 342 according to an embodiment, of the thermally assisted magnetic read write head 340. Specifically, the thermally assisted magnetic write head 342 includes a magnetic pole 344 in which several coils (not shown) are sandwiched, a waveguide 354 formed adjacent to the magnetic pole 344 for guiding light generated by the light source module 220, and a plasmon generator 356 sandwiched between the magnetic pole 344 and the waveguide 354 for propagating near-field light to the ABS 241. And a gap 343 is formed between the waveguide 354 and the plasmon generator 356. Specifically, the magnetic pole 344 has an en surface 344a exposed on the ABS 241, and the counter surface facing the plasmon generator 356. The waveguide 354 has one end surface 354a exposed on the ABS 241 and the other end surface exposed at the backward thereof. The waveguide 354 is formed by a dielectric material that allows laser light to pass therethrough. Commonly, the plasmon generator 356 can be a plasmon antenna.

Concretely, the forward end 356' of the plasmon generator 356 has a near-field light generating surface 356a facing to the ABS 241. The plasmon generator 356 is made of nonmagnetic materials including Au, Ag, Cu, Al, Ti, Ta or Ge element, or alloy thereof such as, which has high light absorption characteristic and low light refraction index, and its thickness is in a range of 10 nm~100 nm.

The plasmon generator 356 generates the near-field light NF from the ABS 241, based on the laser light which has propagated through the waveguide 354. The magnetic pole 344 stores therein magnetic flux generated in coils, and releases the magnetic flux from the ABS 241 to thereby generate a write magnetic field for writing magnetic information into the magnetic disk 301.

During reading and writing operations, the thermally assisted magnetic head 340 aerodynamically flies above the surface of the rotating disks 301 with a predetermined flying height. Thus, the ends of the MR read head and the magnetic write head 342 face the surface of the magnetic recording layer (not shown) of the magnetic disk 301 with an appropriate magnetic spacing. Then the MR read head reads data by sensing signal magnetic field from the magnetic recording layer, and the magnetic write head 342 writes data by applying signal magnetic field to the magnetic recording layer. When writing data, signal current is conducted through the coils and flux is induced into the magnetic poles 344, which causes flux to fringe across the pole tips at the ABS 241. This flux magnetizes circular tracks on the rotating disk 301 during a write operation. Meanwhile, laser light is generated from the light source module 220, for example the laser diode, and propagated through the waveguide 354 and guided to the plasmon generator 356. Then, the near-field generating surface 356a of the plasmon generator 356 will generate near-field light which may be propagated to the ABS 241. The generated near-field light reaches the surface of the magnetic disk 301, and heat a portion of the magnetic recording layer of the magnetic disk 301. As a result, the coercive force of the portion is decreased to a value that facilitates writing; thus the thermally assisted magnetic recording can be accomplished successfully.

Within the contemplation of the present invention, as shown in FIG. 4a, in the thermal assisted magnetic write head 342, a first protective film 401 and a second protective film 402 are so formed selectively as to cover the ABS 241. Concretely, the first protective film 401 directly covers, of the ABS 241 the end surface 344a of the magnetic pole 344; the second protective film 402 directly covers the end surfaces 354a, 356a of the waveguide 354 and the plasmon generator 356. Here, the first protective film 401 may have a thickness that is substantially the same as a thickness of the second protective film 402.

The first protective film 401 is formed of a nonconductive material that is different from a nonconductive material that configures the second protective film 402. More specifically, the first protective film 401 may be formed substantially of a diamond-like carbon (DLC), and the second protective film 402 may be formed substantially of tantalum oxide (TaOx) for example. DLC is superior over TaOx in mechanical strength such as abrasion resistance property. Hence, a large portion of the ABS 241 is covered with the first protective film 401 formed substantially of DLC, making it possible to protect the magnetic read write head 340 from damage such as abrasion upon its activation and stoppage. On the other hand, TaOx is superior over DLC in heat resistance property. Hence, the second protective film 402 that covers the end surface 356a of the forward end 356' where a significant rise in temperature occurs is formed substantially of TaOx, making it possible to prevent degradation of a crystalline structure of the second protective film 402. Further, the second protective film 402 is stable to heat, making it possible to protect the forward end 356'.

Also, the magnetic read write head 342 may be provided with a third protective film 403 that covers the first protective film 401 and the second protective film 402 as a whole. For example, the third protective film 403 may be made substantially of silicon nitride (Si3N4), besides DLC. Si3N4 is lower in oxygen permeability than DLC and is preferable for preventing alteration of the plasmon generator 34 such as oxidation.

Alternatively, the first protective film 401 is made by material which is one or more selected from carbide, DLC, TaOx, SiOx, AlOx, WOx, BCxNy, AlNx, SiNx, AlOxNy, SiOxNy, TiOx, ZrOx, MgOx, ZrOxNy, YOx, NbOx, and GaNx.

Alternatively, the first protective film 401 is formed of transparent or translucent material that light can be passed.

Alternatively, the second protective film 402 is made by the low light absorption material. The low light absorption material is made by material which is one or more selected from TaOx, SiOx, AlOx, WOx, BCxNy, AlNx, SiNx, AlOxNy, SiOxNy, TiOx, ZrOx, MgOx, ZrOxNy, YOx, NbOx, and GaNx.

Figure 4B:
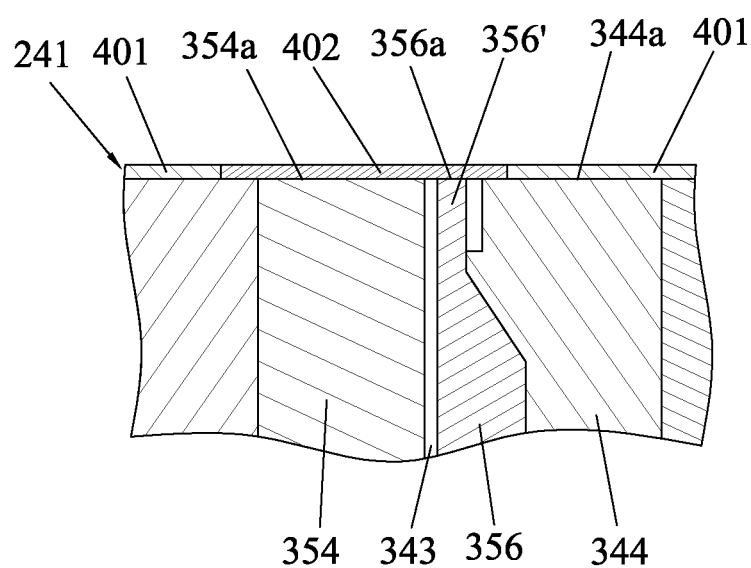
FIG. 4b is a cross-sectional view of the thermally assisted magnetic write head according to another embodiment of the present invention.

Preferably, as another embodiment of the present invention, a part of the end surface 344a of the magnetic pole 344 is directly covered by the second protective film 402, as shown in FIG. 4b.

Figure 3A:
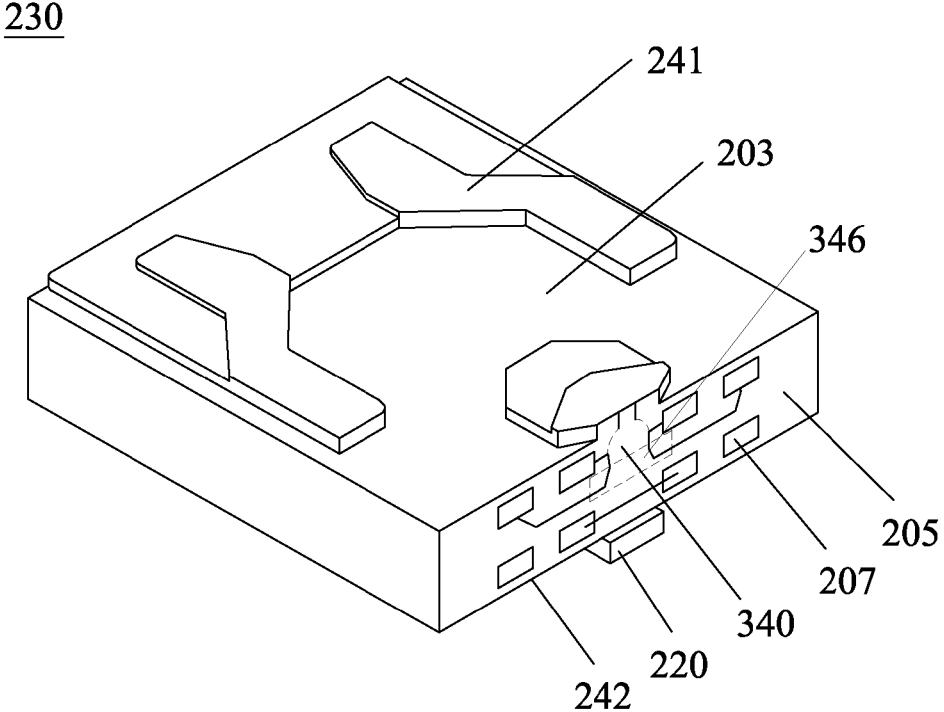
FIG. 3a is a perspective view of a thermally assisted magnetic head slider with a thermally assisted magnetic write head according to an embodiment of the present invention.
Figure 3B:
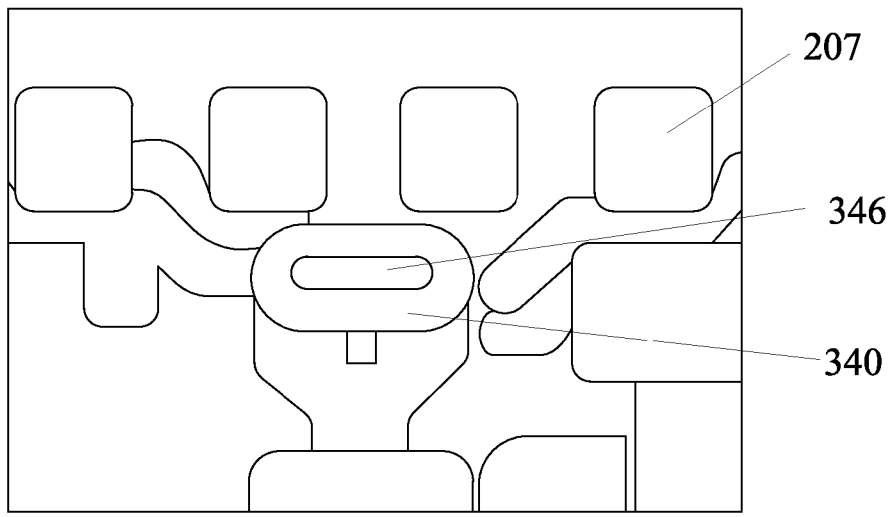

As a preferable embodiment, as shown in FIG. 3a, 3b, the thermal assisted magnetic write head 342 further includes a light shield 346 adjacent the magnetic pole 344 thereby protecting other components of the thermally assisted magnetic write head 342, when a light is emitted to the backside of the thermally assisted magnetic write head 342 at a row bar or multiple row bars with a number of magnetic read write head 340 arranged. Preferably, the light shield 346 is made by metal material, such as Cu or NiFe.

Figure 5A:
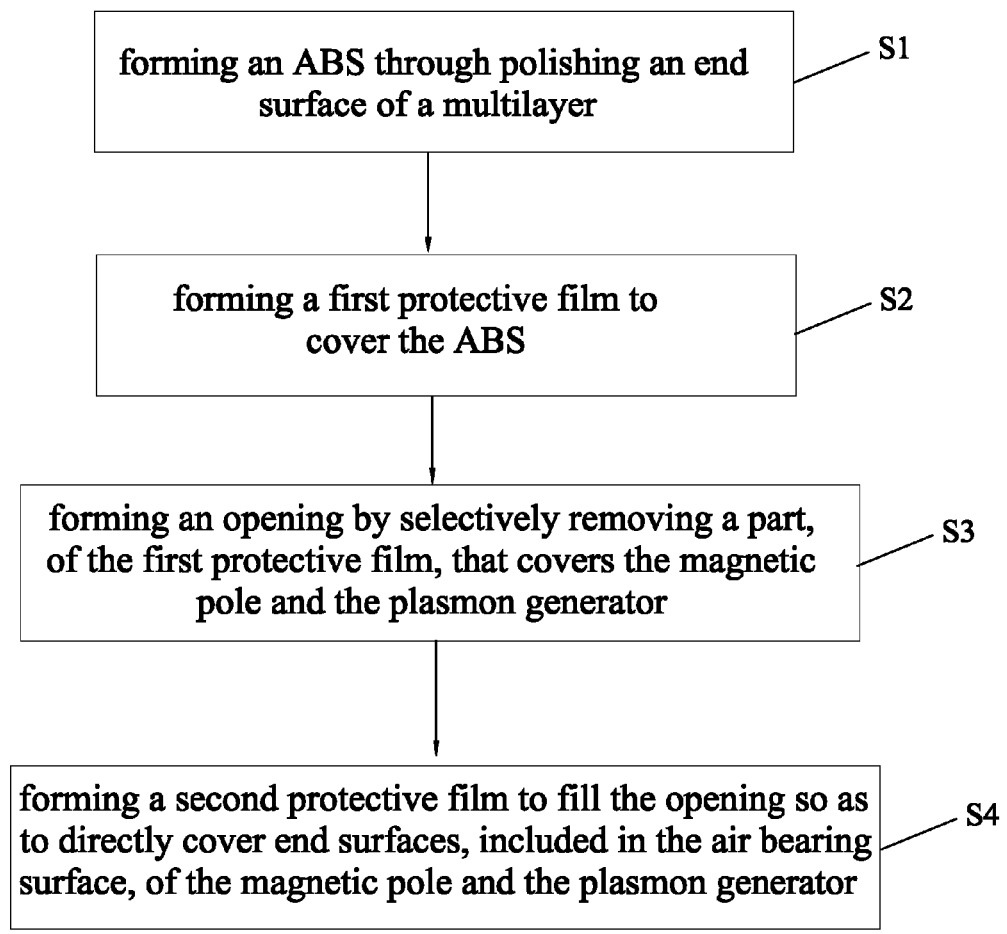
FIG. 5a is a flowchart of a method of manufacturing a thermally assisted magnetic write head according to a first embodiment of the present invention.

FIG. 5a is a flowchart of a method of manufacturing a thermally assisted magnetic write head according to a first embodiment of the present invention. The method includes the following steps at least:

S1, forming an ABS through polishing an end surface of a multilayer, the multilayer including a waveguide, a magnetic pole, and a plasmon generator;

S2, forming a first protective film to cover the ABS;

S3, forming an opening by selectively removing a part, of the first protective film, that covers the magnetic pole and the plasmon generator; and S4, forming a second protective film to fill the opening so as to directly cover end surfaces, included in the air bearing surface, of the magnetic pole and the plasmon generator.

Figure 5B:
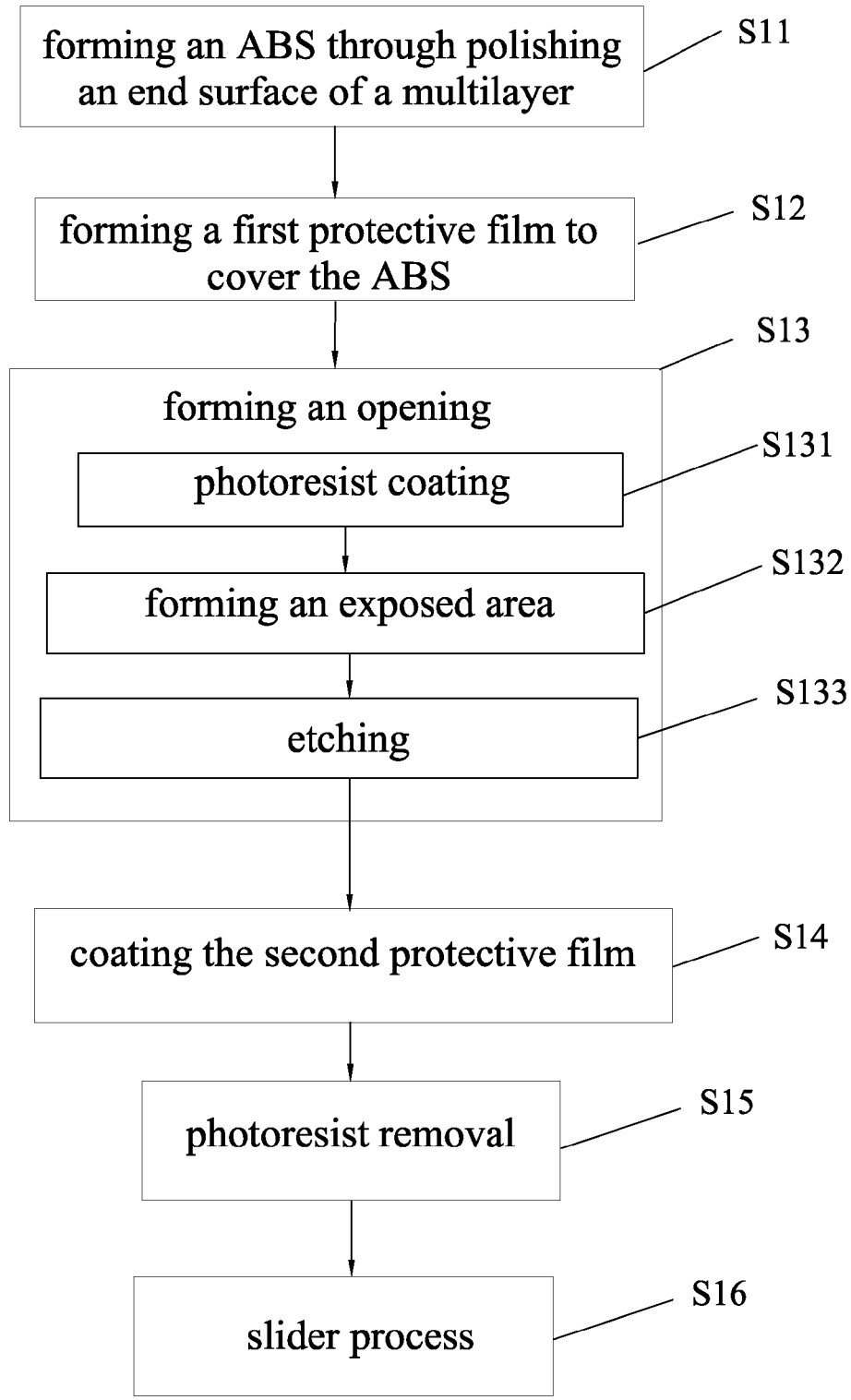
FIG. 5b is a simplified flowchart of a method of manufacturing a thermally assisted magnetic write head according to a second embodiment of the present invention.
Figure 6:
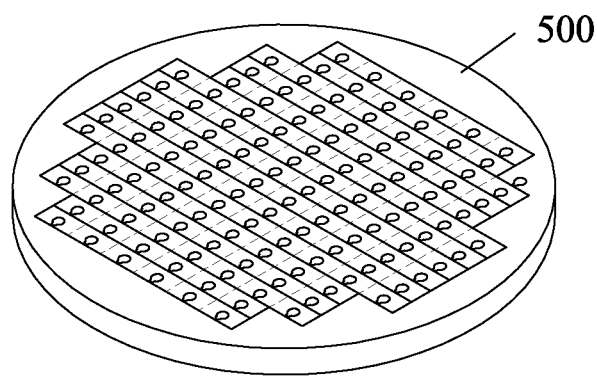
FIG. 6 is a perspective view illustrating a process in a method of manufacturing the thermally assisted magnetic write head according to the second embodiment of the present invention.
Figure 7:
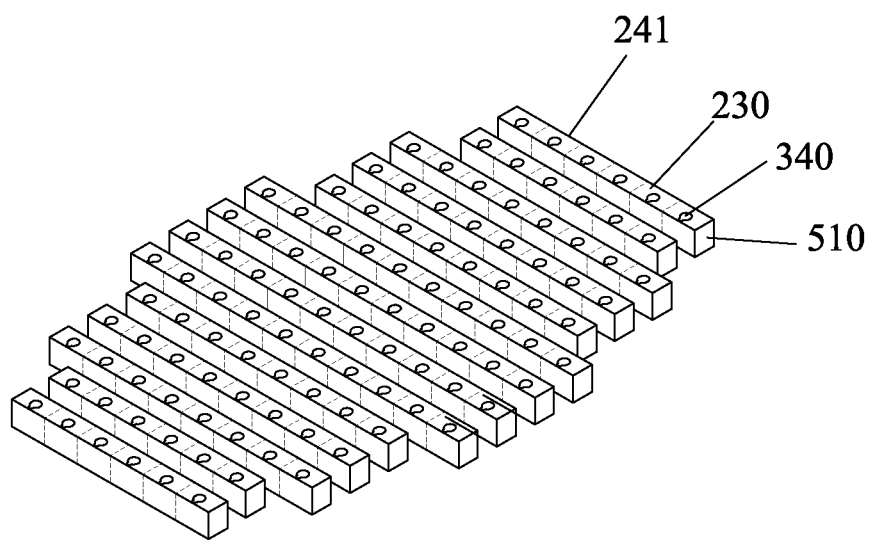
FIG. 7 is a perspective view illustrating a process subsequent to that of FIG. 6.

FIG. 5b is a simplified flowchart of a method of manufacturing a thermally assisted magnetic write head according to a second embodiment of the present invention. FIG. 6 is a perspective view illustrating a process in a method of manufacturing the thermally assisted magnetic write head according to the second embodiment of the present invention. FIG. 7 is a perspective view illustrating a process subsequent to that of FIG. 6; FIGS. 8-13 are sectional views illustrating a process subsequent to that of FIG. 7.

The simplified procedures includes:

S11, forming an ABS through polishing an end surface of a multilayer, the multilayer including a waveguide, a magnetic pole, and a plasmon generator;

S12, forming a first protective film to cover the ABS;

S13, forming an opening;

S131, photoresist coating;

S132, forming an exposed area;

S133, etching;

S14, coating the second protective film; and

S15, photoresist removal.

S16, slider process.

Specifically, first, as illustrated in FIG. 6, a wafer 500 which may be made of, for example, AlTiC is prepared. The wafer 500 serves eventually as a plurality of sliders 230. Thereafter, a plurality of magnetic read write heads 340 are formed in an array on the wafer 500. The magnetic read write head 340 is manufactured mainly by forming and stacking a series of components by using an existing thin-film process. As the mainly processes are well known to persons ordinarily skilled in the art, thus its detailed description is omitted here.

Thereafter, as illustrated in FIG. 7, the wafer 500 is cut to form a plurality of row bars 510. The plurality of magnetic read write heads 340 are formed in line in each of the bars 510.

Figure 8:
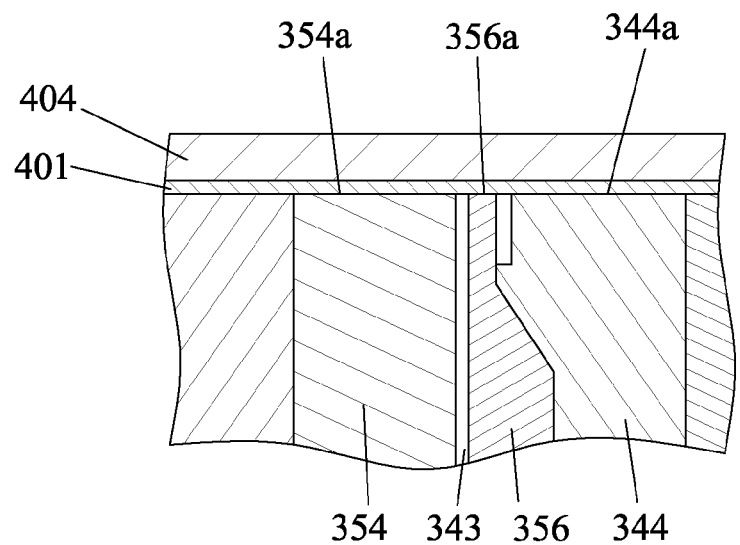
FIGS. 8-13 are sectional views illustrating processes subsequent to that of FIG. 7.

After forming the ABS 241, the first protective film 401 is so formed as to cover an entire part of the ABS 241 as illustrated in FIG. 8. The first protective film 401 may be formed using DLC, for example. Commonly, the DLC film 401 is formed by deposition process (S12).

Figure 9:
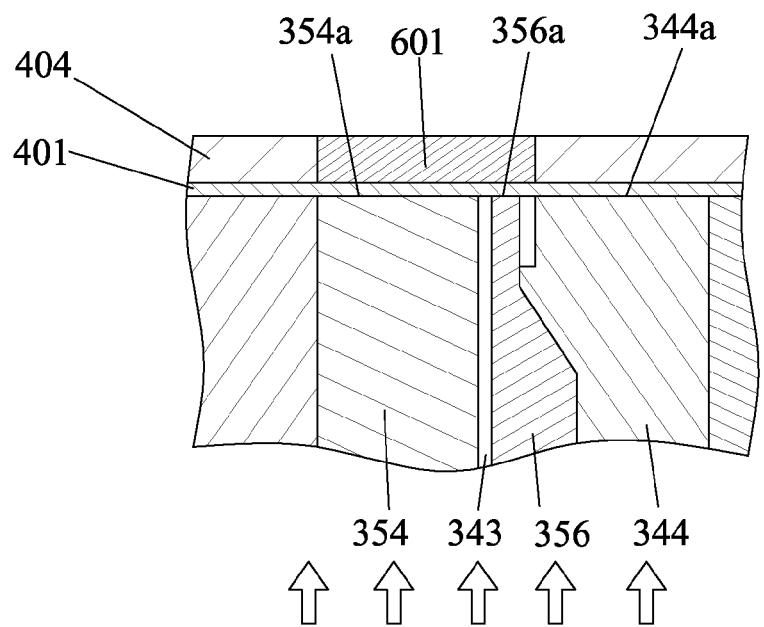
Figure 10:
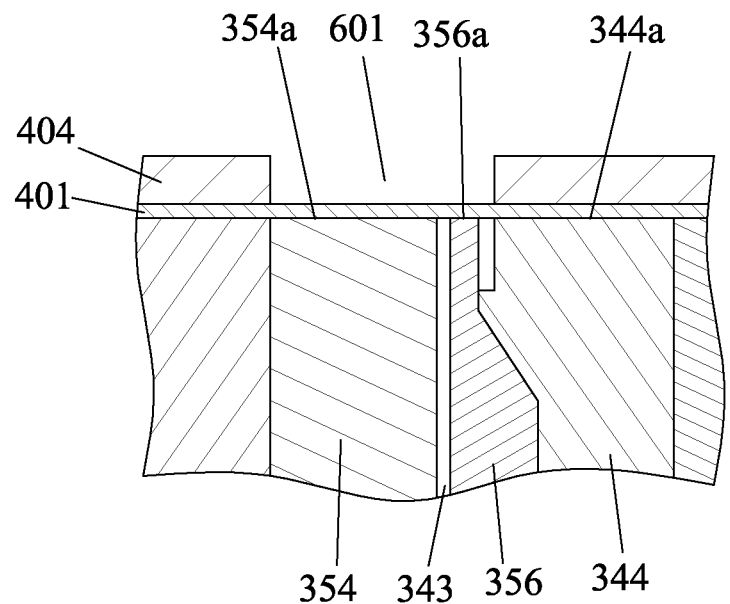
Figure 11:
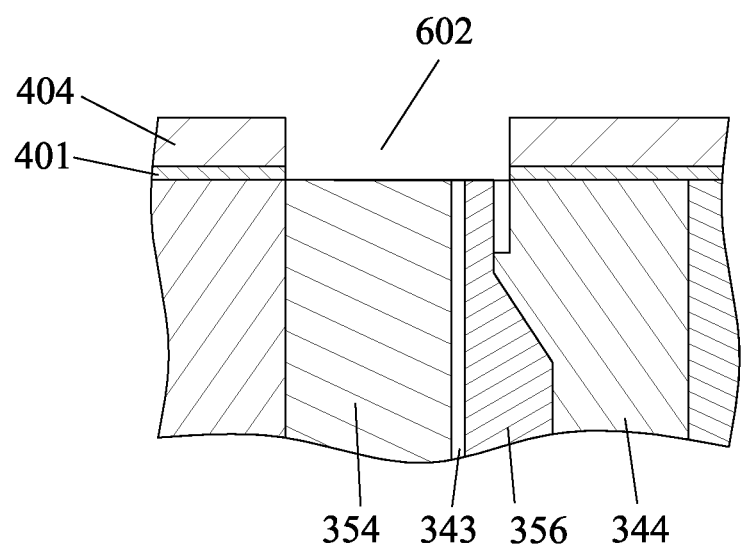
Figure 12:
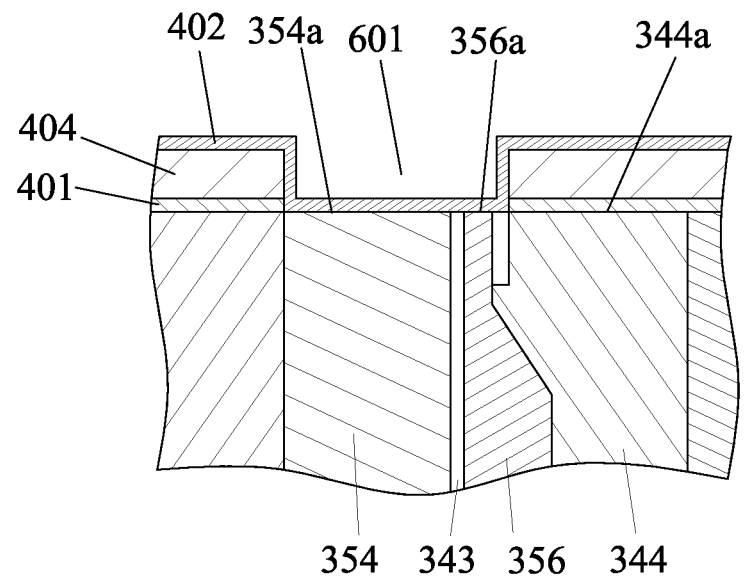
Figure 13:
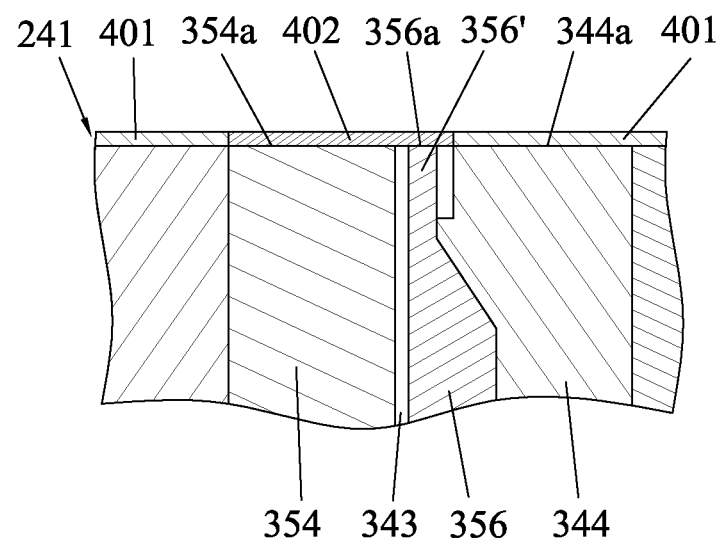
Figure 14:
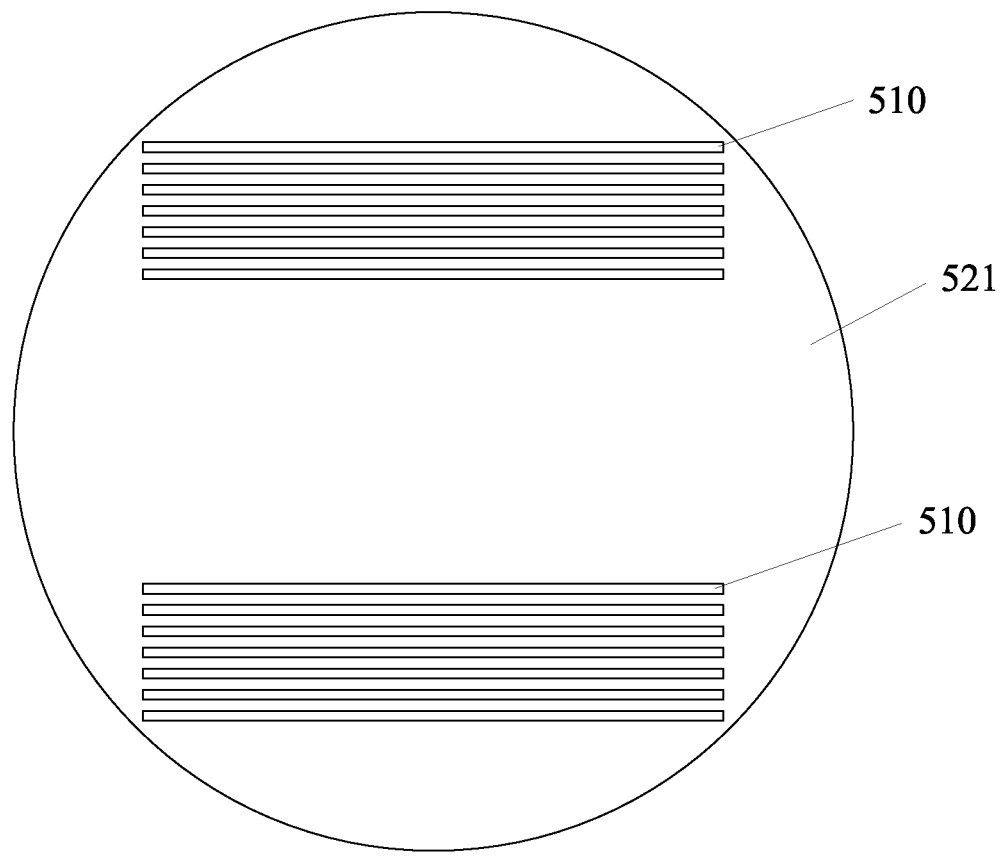
FIG. 14 is a top view illustrating several row bars being processed on a quartz substrate.
Figure 15A:
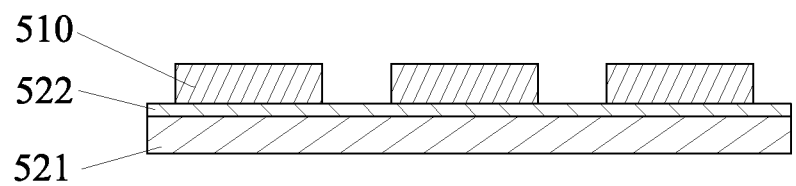
FIGS. 15a-15d are side views of FIG. 14 that illustrate how the exposed area is formed according to one embodiment of the present invention.
Figure 15B:
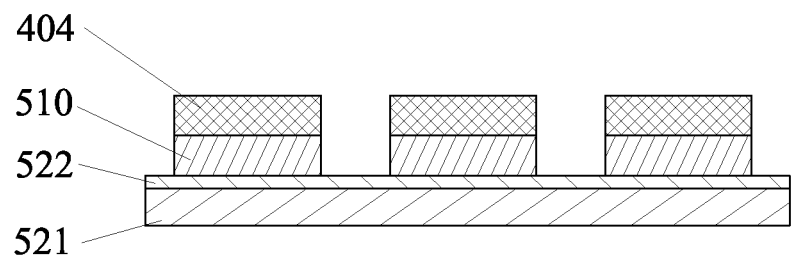
Figure 15C:
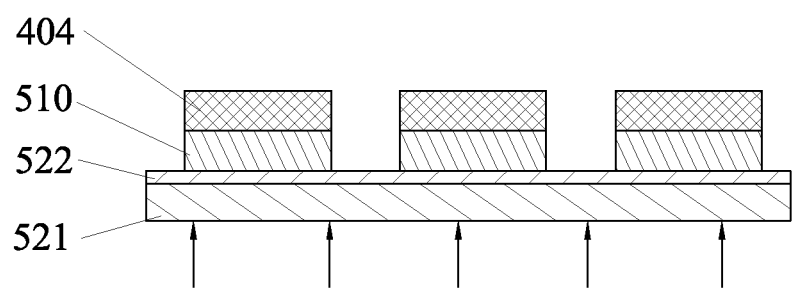
Figure 15D:
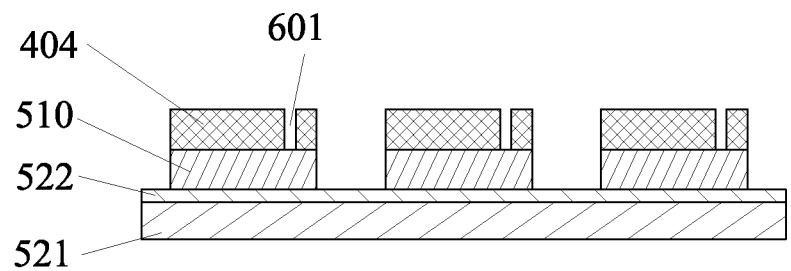

Then, as shown in FIG. 8, a photoresist 404 is coated on the first protective film 401, and a part of the photoresist 404 that covers the waveguide 354 and the plasmon generator 356 is removed, to form an exposed area 601 corresponding to the part of the first protective film 401 that covers the end surfaces 354a, 356a of the waveguide 354 and the plasmon generator 356. As shown in FIGS. 9 and 10, the exposed area 601 may be obtained by irradiating a light or laser from a back surface of the waveguide 354 opposite the end surface 354a. Concretely, wavelength of the light or laser is not limited, any suitable wavelength could be used only if the photoresist 404 can be exposed to light. For example, the wavelength of the light or laser is lower than 500 nm, such as an UV light or UV laser which can lower coupling efficiency to the plasmon generator 356, and in turn protect the plasmon generator 356. And then, the opening 602 as illustrated in FIG. 11 is formed by etching process, for example. Alternatively, After forming the opening, the second protective film 402 is so formed as to fill the opening 602 and to cover the end surfaces 354a, 356a of waveguide 354 and the plasmon generator 356 as well as their neighborhoods. Concretely, the second protective film 402 covering on the first protective film 401 may be removed by removing the photoresist 404, so that the second protective film 402 is filled in the opening, thereby directly covering the end surfaces 354a, 356a of the waveguide 354 and the plasmon generator 356, and the film protective film 401 directly covers the end surfaces 344a of the magnetic pole 344 and the other portions.

The method further includes forming a light shield adjacent the magnetic pole 344 thereby protecting other components of the thermally assisted magnetic write head 342.

Finally, the row bar 510 will be cut into a plurality of individual thermally assisted magnetic head sliders 230; thereby the whole process is accomplished.

As a preferred embodiment, procedures S11 to S16 are performed on a quartz (glass) substrate 521. As shown in FIGS. 14, 15a-15d, the row bars 510 are put on a quartz substrate 521. Concretely, a transparent tape 522 is configured on the surface of the quartz substrate 521, to support the row bars 510. When forming the exposed area 601, the light or laser is emitted to a side of the quartz substrate 510 and then reached to the photoresist 404.

Compared with the prior art, on one hand, the end surface 344a of the magnetic pole 344 is covered by the first protective film 401, and the end surface 356a of the plasmon generator 356 are covered by the second protective film, thus, when using a laser to enter to the plasmon generator 356, agglomeration arising from a rise in temperature of the plasmon generator 356 upon operation is suppressed. As a result, higher-density magnetic recording is possible, and the product lifetime increases.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. A thermally assisted magnetic write head, comprising:
   a waveguide having a first end surface included in an air bearing surface;
   a magnetic pole having a second end surface included in the air bearing surface;
   a plasmon generator having a third end surface included in the air bearing surface;
   a first protective film directly covering a part of the second end surface of the magnetic pole at least; and
   a second protective film directly covering the first end surface of the waveguide and the third end surface of the plasmon generator.

2. The thermally assisted magnetic write head according to claim 1, wherein the first protective film is formed of diamond-like carbon.

3. The thermally assisted magnetic write head according to claim 1, wherein the first protective film is formed of transparent or translucent material.

4. The thermally assisted magnetic write head according to claim 1, wherein the second protective film is formed of tantalum oxide (TaO$_x$).

5. The thermally assisted magnetic write head according to claim 1, wherein a part of the second end surface of the magnetic pole is directly covered by the second protective film.

6. The thermally assisted magnetic write head according to claim 1, further comprising a light shield adjacent the magnetic pole thereby protecting other components of the thermally assisted magnetic write head.

7. A head gimbal assembly, comprising:
   a magnetic head slider having a thermally assisted magnetic write head according to claim 1; and
   a suspension to support the magnetic head slider.

8. A head arm assembly, comprising:
   a magnetic head slider having a thermally assisted magnetic write head according to claim 1;
   a suspension having a first end and a second end, the first end being attached with the magnetic head slider; and
   an arm supporting the suspension at the second end thereof.

9. A magnetic disk unit, comprising a magnetic recording medium and a head arm assembly, wherein the head arm assembly comprises:
   a magnetic head slider having a thermally assisted magnetic write head according to claim 1;
   a suspension having a first end and a second end, the first end being attached with the magnetic head slider; and
   an arm supporting the suspension at the second end thereof.

10. A method of manufacturing a thermally assisted magnetic write head, comprising steps of:
   (1) forming an air bearing surface through polishing an end surface of a multilayer, the multilayer including a waveguide, a magnetic pole, and a plasmon generator;
   (2) forming a first protective film to cover the air bearing surface;
   (3) forming an opening by selectively removing a part, of the first protective film, that covers the waveguide and the plasmon generator; and
   (4) forming a second protective film to fill the opening so as to directly cover end surfaces, included in the air bearing surface, of the waveguide and the plasmon generator.

11. The method according to claim 10, wherein the step (3) comprises:
   forming a photoresist film to cover the first protective film;
   irradiating a light or laser to a back surface of the waveguide opposite the end surface, to form an exposed area corresponding to the end surfaces of the waveguide and the plasmon generator; and
   forming the opening by etching the exposed area.

12. The method according to claim 11, wherein the light or laser has a wavelength that is lower than 500 nm.

13. The method according to claim 10, wherein the step (4) comprises:
   forming the second protective film to cover the photoresist film and fill the opening; and
   removing the photoresist film.

14. The method according to claim 10, further comprising forming a light shield adjacent the magnetic pole thereby protecting other components of the thermally assisted magnetic write head.

15. The method according to claim 10, wherein the step (3) is performed on a row bar or multiple row bars with a plurality of thermally assisted magnetic write heads.

16. The method according to claim 15, further comprising putting the row bars on a quartz substrate, and irradiating a light or laser to a side of the quartz substrate.

* * * * *